United States Patent
Bringuier et al.

(10) Patent No.: US 6,501,887 B1
(45) Date of Patent: Dec. 31, 2002

(54) FIBER OPTIC CABLE HAVING WATER BLOCKING AND FLAME RETARDANT PROPERTIES

(75) Inventors: Anne G. Bringuier, Taylorsville, NC (US); Jimmy B. Dameron, Hickory, NC (US); Samuel D. Nave, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 117 days.

(21) Appl. No.: 09/651,787

(22) Filed: Aug. 30, 2000

(51) Int. Cl.⁷ .................................................. G02B 6/44
(52) U.S. Cl. ..................................................... 385/109
(58) Field of Search .................. 439/109–114, 100–108

(56) References Cited

U.S. PATENT DOCUMENTS

| | | | |
|---|---|---|---|
| 3,902,879 A | 9/1975 | Siegmund | 65/3 |
| 3,944,717 A | 3/1976 | Hacker et al. | 174/23 C |
| 4,129,616 A | 12/1978 | Zingheim | 260/878 R |
| 4,143,942 A | 3/1979 | Anderson | 350/96.23 |
| 4,319,940 A | 3/1982 | Arroyo et al. | 156/56 |
| 4,367,917 A | 1/1983 | Gray | 350/96.23 |
| 4,430,470 A | 2/1984 | Taniguchi et al. | 524/269 |
| 4,575,184 A | 3/1986 | Ueno et al. | 350/96.23 |

(List continued on next page.)

OTHER PUBLICATIONS

US 5,020,875, 6/1991, Arroyo et al. (withdrawn).

*Using Triboelectric Technology to Apply Powders While Reducing Factory Contamination;* International Wire & Cable Symposium Proceedings 1996, pp. 575–579, Frank T. Hughes.

*Development of a Riser Rated Indoor/Outdoor Loose Tube Fiber Optic Cable;* International Wire & Cable Symposium Proceedings 1996, pp. 369–373, Scott M.Chastain and James W. Thornton.

Primary Examiner—Khiem Nguyen
(74) Attorney, Agent, or Firm—Timothy J. Aberle

(57) ABSTRACT

A fiber optic cable having both water blocking and flame retardant properties that is particularly useful for indoor or indoor/outdoor applications. In one embodiment, the fiber optic cable includes at least one buffer tube, at least one optical fiber disposed within the buffer tube, a composite tape surrounding the buffer tube that comprises a layer formed of an inherently flame retardant material and at least one coating a water swellable material, and a jacket surrounding the composite tape. The fiber optic cable can also include a water blocking element disposed within the buffer tube. The water swellable coatings of the composite tape and the water blocking element within the buffer tube therefore inhibit water migration along the length of the cable, while the flame retardant layer of the composite tape provides fire resistance. In another aspect, a dry fiber optic cable that includes a buffer tube comprised of an inherently flame retardant material, at least one optical fiber disposed within the buffer tube, a first tape comprised of a water swellable material that at least partially surrounds the at least one optical fiber, at least one roving extending lengthwise along the buffer tube and having a coating comprised of a water swellable material, and a jacket surrounding the buffer tube and the at least one roving. As such, the buffer tube provides flame retardant properties, while the first tape and the water swellable coating of the at least one roving inhibit water migration along the length of the cable.

12 Claims, 2 Drawing Sheets

U.S. PATENT DOCUMENTS

| | | | |
|---|---|---|---|
| RE32,131 E | 4/1986 | Stahl | 428/215 |
| 4,673,247 A | 6/1987 | Oestreich | 350/96.23 |
| 4,697,877 A | 10/1987 | Hida et al. | 350/96.3 |
| 4,723,831 A | 2/1988 | Johnson et al. | 350/96.23 |
| 4,762,751 A | 8/1988 | Girgis et al. | 428/378 |
| 4,770,493 A | 9/1988 | Ara et al. | 350/96.3 |
| 4,787,707 A | 11/1988 | Kitayama et al. | 350/96.23 |
| 4,820,012 A | 4/1989 | Asai | 350/96.23 |
| 4,867,526 A | 9/1989 | Arroyo | 350/96.23 |
| 4,892,382 A | 1/1990 | Story et al. | 350/96.23 |
| 4,913,517 A | 4/1990 | Arroyo et al. | 350/96.23 |
| 5,010,209 A | 4/1991 | Marciano-gostinelli et al. | 174/23 C |
| 5,018,828 A | 5/1991 | Ohdaira et al. | 350/96.34 |
| 5,082,719 A | 1/1992 | Arroyo | 428/219 |
| 5,093,880 A | 3/1992 | Matsuda et al. | 385/100 |
| 5,131,064 A | 7/1992 | Arroyo et al. | 385/102 |
| 5,133,034 A | 7/1992 | Arroyo et al. | 385/107 |
| 5,136,683 A | 8/1992 | Aoki et al. | 385/141 |
| 5,179,611 A | 1/1993 | Umeda et al. | 385/110 |
| 5,185,840 A | 2/1993 | Iapicco | 385/100 |
| 5,204,175 A | 4/1993 | Umeda et al. | 428/288 |
| 5,206,926 A | 4/1993 | Yamamoto et al. | 385/143 |
| 5,217,808 A | 6/1993 | Cobb | 428/392 |
| 5,253,318 A | 10/1993 | Sayegh et al. | 385/114 |
| 5,261,021 A | 11/1993 | Pasta et al. | 385/100 |
| 5,291,573 A | 3/1994 | Yoshida et al. | 385/103 |
| 5,321,788 A | 6/1994 | Arroyo et al. | 385/109 |
| 5,345,525 A | 9/1994 | Holman et al. | 385/104 |
| 5,358,011 A | 10/1994 | Stockton et al. | 138/103 |
| 5,378,539 A | 1/1995 | Chen | 428/378 |
| 5,389,442 A | 2/1995 | Arroyo et al. | 428/396 |
| 5,495,546 A | 2/1996 | Bottoms, Jr. et al. | 385/101 |
| 5,542,020 A | 7/1996 | Horska | 385/112 |
| 5,566,266 A | 10/1996 | Nave et al. | 285/113 |
| 5,630,003 A | 5/1997 | Arroyo | 385/113 |
| 5,689,601 A | 11/1997 | Hager et al. | 385/100 |
| 5,756,159 A | 5/1998 | Hoskins et al. | 427/394 |

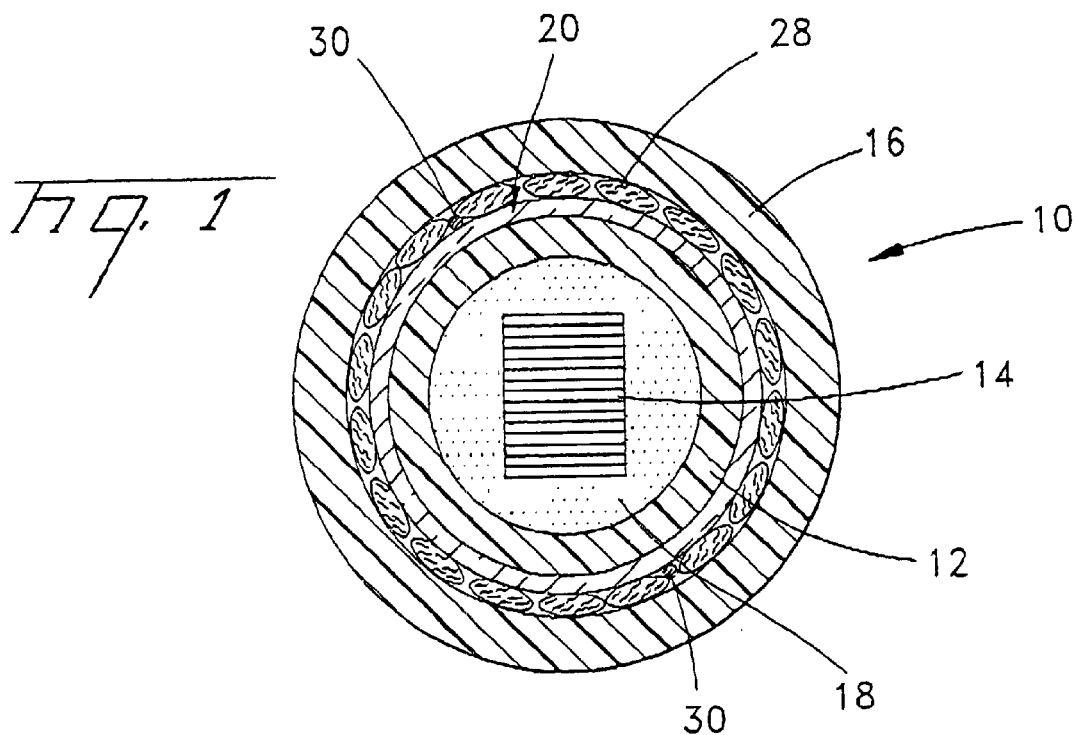
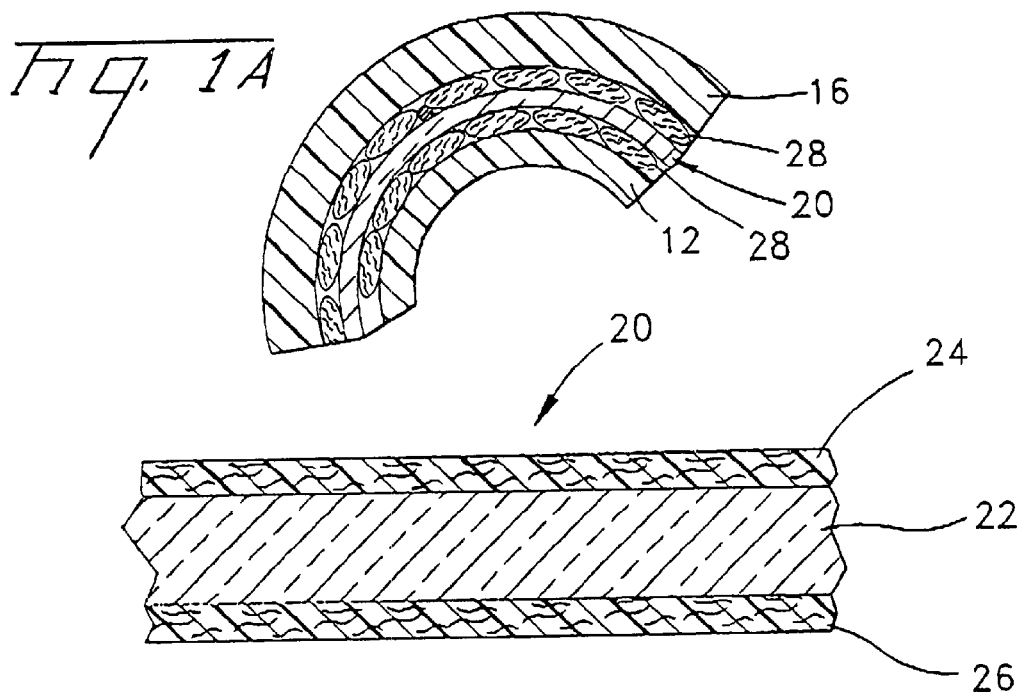

FIBER OPTIC CABLE HAVING WATER BLOCKING AND FLAME RETARDANT PROPERTIES

FIELD OF THE INVENTION

The present invention relates generally to fiber optic cables and, more particularly, to fiber optic cables, such as indoor/outdoor cables, that have both water blocking and flame retardant properties.

BACKGROUND OF THE INVENTION

Fiber optic cable generally must have different properties and meet different requirements depending upon the intended application of the cable. For example, fiber optic cable that is intended for outdoor use generally includes water blocking elements to prevent the infiltration of water and, in instances in which water does penetrate the cable, to mitigate the effects of the water. In contrast, fiber optic cables that are intended for indoor use do not generally have to be designed to be water blocking, but are commonly required to be flame retardant. Moreover, some fiber optic cables are intended for indoor/outdoor use and, as such, must have both water blocking and flame retardant properties.

A fiber optic cable generally includes one or more buffer tubes, one or more optical fibers disposed within each buffer tube and an outer jacket surrounding the buffer tube(s). Fiber optic cables that are intended for outdoor or indoor/outdoor use must also include elements to prevent or mitigate the effects of water that may infiltrate either the space between the outer jacket and the buffer tube(s) or the interior of the buffer tube(s). In this regard, fiber optic cables that are intended for outdoor or indoor/outdoor use include water blocking elements to prevent the longitudinal migration of water through the fiber optic cable such that any water that might infiltrate the cable does not reach the cable closures, connectors or other electro-optical equipment to which the fiber optic cable is connected and which may be damaged by exposure to water.

In order to prevent water migration through the interior of a fiber optic cable, a fiber optic cable typically includes a grease-like filling compound that fills the interior passageways defined by the cable. In particular, the grease-like filling compound typically fills the buffer tube(s) as well as any space between the buffer tube(s) and the outer jacket. However, use of a grease-like filling compound presents a number of disadvantages. For example, the grease-like filling compound is relatively messy and complicates splicing or other connection of the optical fibers of the fiber optic cable. In this regard, the grease-like filling compound must be removed from the end portions of the optical fibers and the optical fibers must be cleaned prior to installation, splicing or other connection of the optical fibers. As will be apparent, cleaning of the grease-like filling compound from the optical fibers is a time-consuming process requiring chemical solvents which, in turn, creates additional problems relating to their subsequent disposal.

In an attempt to overcome at least some of the disadvantages associated with the use of grease-like filling compounds, dry fiber optic cables have been developed that do not include grease-like filling compounds and, instead, include other types of water blocking elements including water swellable yarns and tapes. These water swellable elements generally include water swellable particles that swell upon exposure to water so as to form a blockage in the cable that prevents the further longitudinal migration of the water through the cable. Typically, the water swellable particles are formed of a superabsorbent polymer. As known to those skilled in the art, superabsorbent polymers are partially cross-linked polymers that absorb many times their own weight in water and swell considerably without dissolving. Examples of superabsorbent polymers are acrylate, urethane or cellulosic-based superabsorbent materials. By way of example, a water swellable tape often includes a plurality of water swellable particles sandwiched between a pair of nonwoven fabric layers. Alternatively, a water swellable yarn can be coated or impregnated with water swellable particles.

In order to prevent water migration through a buffer tube, optical fibers within the buffer tube can be wrapped with a water swellable tape or yarn. Likewise, to prevent water migration between the outer jacket and the buffer tube(s), the buffer tube(s) can be wrapped with a water swellable tape or yarn. While effective in preventing water migration through a cable, the water swellable tapes or yarns that are wrapped about the buffer tube(s) in order to prevent water migration between the outer jacket and the buffer tube(s) may disadvantageously increase the size of the fiber optic cable.

While water exposure and the prevention of water migration is not a substantial concern, indoor cables must be designed to be flame retardant. As such, indoor cables, as well as indoor/outdoor cables, can include a tape formed of a flame retardant material, such as mica, that is wrapped about the buffer tube(s) prior to extruding the outer jacket thereover. Moreover, indoor cables can include an outer jacket formed of a flame retardant plastic material.

Due to their use in both interior and exterior applications, indoor/outdoor cables must generally include both water blocking and flame retardant properties. Within a buffer tube, an indoor/outdoor cable generally includes a grease-like filling compound in order to prevent water migration therethrough. Moreover, wrapped about the buffer tube(s) in the space between the buffer tube(s) and the outer jacket, an indoor/outdoor cable generally includes a tape formed of a flame retardant material, such as mica, sandwiched between a pair of water swellable tapes. The flame retardant tape will provide the necessary flame retardant properties, while the water swellable tapes prevent water migration along the length of the fiber optic cable in the space between the outer jacket and the buffer tube(s). Unfortunately, the grease-like filling compound complicates installation and splicing of the fiber optic cable, while the water swellable tapes disadvantageously increase the overall size of the fiber optic cable. Moreover, the cable elements required to provide both water blocking and flame retardant properties for an indoor/outdoor cable increase the number of cable components which, in turn, increases the complexity of the fabrication process as well as the resulting cost of the fiber optic cable. Thus, it would be advantageous to provide a fiber optic cable having both water blocking and flame retardant properties, such as for use in indoor/outdoor applications, which was craft-friendly and which reduced the number of cable components which, in turn, may reduce the size and cost of the fiber optic cable.

SUMMARY OF THE INVENTION

An improved fiber optic cable having both water blocking and flame retardant properties is therefore provided. As such, the fiber optic cable is particularly useful for indoor/outdoor applications. According to one aspect of the invention, the fiber optic cable includes a buffer tube, at least one optical fiber disposed within the buffer tube, a composite tape surrounding the buffer tube that comprises a layer formed of a flame retardant material and a first coating that is formed of a water swellable material and that is disposed on one surface of the flame retardant layer, and a jacket surrounding the composite tape. In the preferred embodiment, the composite tape further comprises a second coating formed of a water swellable material that is disposed on the opposite surface of the flame retardant layer from the first coating. Advantageously, the water swellable coatings of the composite tape prevent water migration between the jacket and the buffer tube while the flame retardant layer of the composite tape provides fire resistance.

The fiber optic cable can also include a water blocking element disposed within the buffer tube for preventing water migration through the buffer tube. In one embodiment, for example, the fiber optic cable includes a filling compound disposed within the buffer tube and surrounding the at least one optical fiber. Alternatively, the fiber optic cable can include a tape comprised of a water swellable material that at least partially surrounds the at least one optical fiber.

According to another aspect of the present invention, a dry fiber optic cable is provided that includes a buffer tube comprised of a flame retardant material, at least one optical fiber disposed within the buffer tube, a first tape comprised of a water swellable material that at least partially surrounds the at least one optical fiber, at least one roving extending lengthwise along the buffer tube and having a coating comprised of a water swellable material, and a jacket surrounding the buffer tube and the at least one roving. As such, the buffer tube provides flame retardant properties. In addition, the first water swellable tape prevents water migration through the buffer tube, while the water swellable coating of the at least one roving prevents water migration between the jacket and the buffer tube. According to either aspect of the present invention, the fiber optic cable advantageously provides both flame retardant and water blocking properties and is therefore especially well suited for indoor/outdoor applications.

BRIEF DESCRIPTION OF THE DRAWINGS

Figure 3:
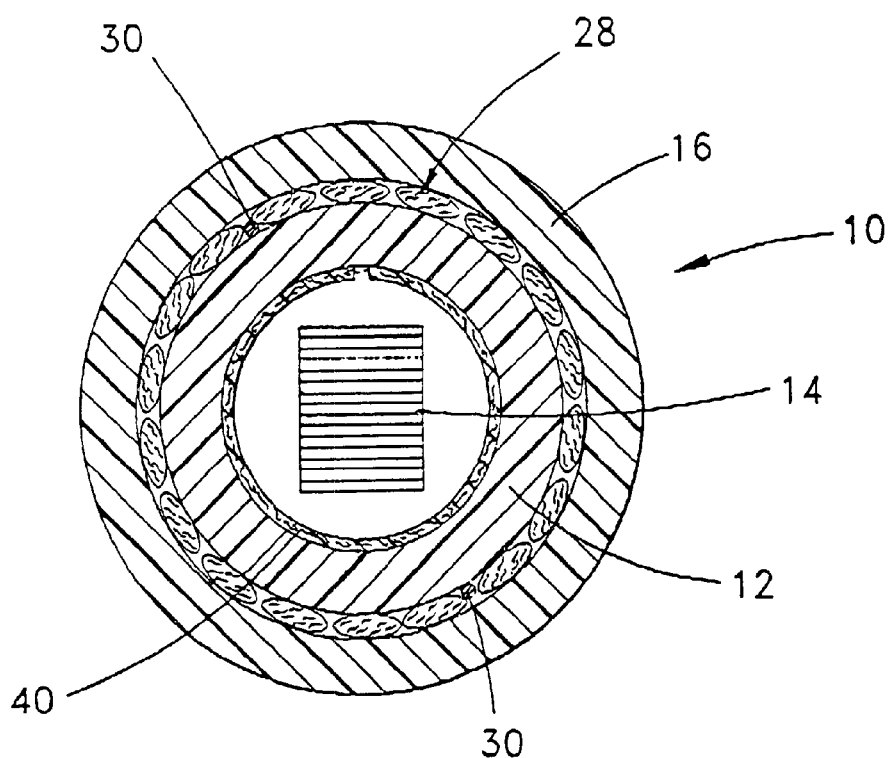
Figure 4:
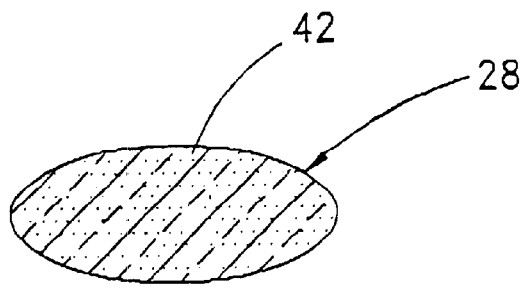

Having thus described the invention in general terms, reference will now be made to the accompanying drawings, which are not necessarily drawn to scale, and wherein:

FIG. 1 is a cross-sectional view of a fiber optic cable in accordance with one embodiment of the present invention;

FIG. 1A is a partial cross sectional view of a second embodiment of the present invention;

FIG. 2 is a fragmentary cross-sectional view of the composite tape that surrounds the buffer tube of the fiber optic cable of FIG. 1 that includes a fire retardant layer and first and second water swellable coatings on opposite sides of the fire retardant layer;

FIG. 3 is a cross-sectional view of a fiber optic cable in accordance with another embodiment of the present invention; and FIG. 4 is a cross-sectional view of a roving of the fiber optic cable of FIG. 3 that includes a water swellable coating.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The fiber optic cable 10 according to one embodiment of the present invention is depicted in cross section in FIG. 1. Fiber optic cable 10 includes at least one buffer tube 12, at least one optical fiber 14 disposed within each buffer tube and an outer jacket 16 surrounding buffer tube 12. Although fiber optic cable 10 of FIG. 1 is shown to include a stack of fiber optic ribbons, fiber optic cable 10 could alternatively include one or more optical fibers in a non-ribbonized format, such as optical fibers in either an unbundled or a bundled mode. Regardless of the format, each optical fiber preferably includes a silica-based core that is operative to transmit light and is surrounded by a silica-based cladding having a lower index of refraction than the core. A soft primary coating surrounds the cladding, and a relatively rigid secondary coating surrounds the primary coating. Each optical fiber can be, for example, a single-mode or multi-mode fiber available commercially from Corning Inc.

Fiber optic cable 10 of FIG. 1 preferably includes a single buffer tube 12. Alternatively, fiber optic cable 10 could include a plurality of buffer tubes, such as a plurality of buffer tubes helically stranded about a central strength member, if so desired. For purposes of explanation, however, fiber optic cable 10 will be hereafter described in accordance with the illustrated embodiments that include a single buffer tube. In the embodiment depicted in FIG. 1, buffer tube 12 is typically formed of polypropylene. However, buffer tube 12 can be formed of other materials, including flame retardant materials such as flame retardant polyethylene and flame retardant polyvinylchloride (PVC) as described in conjunction with another embodiment of fiber optic cable 10 depicted in FIG. 3.

Fiber optic cable 10 preferably includes a water blocking element 18 disposed within buffer tube 12 so as to prevent water migration through buffer tube 12 and along the length of fiber optic cable 10. In the embodiment depicted in FIG. 1, water blocking element 18 is preferably a grease-like filling compound, such as the grease-like filling compound provided by Dussek Campbell, Inc. bearing product number 5264. Alternatively, fiber optic cable 10 can include a tape comprised of a water swellable material disposed within buffer tube 12. For example, fiber optic cable 10 of this alternative embodiment can include one or more water swellable tapes longitudinally wrapped about optical fibers 14. The water swellable tapes typically include a plurality of superabsorbent particles, typically formed of a partially cross-linked acrylate polymer, sandwiched between a pair of nonwoven fabric layers. However, the water swellable tape can be formed in other fashions and may, for example, include a tape that is impregnated or coated with superabsorbent particles. Regardless of the type of water blocking element, water blocking element 18 inhibits water migration through buffer tube 12.

An outer jacket 16 that surrounds buffer tube 12 can be comprised of various materials, but is typically formed of a plastic, such as PVC. In a preferred embodiment, for example, outer jacket 16 can be comprised of a riser-type of PVC, such as the PVC supplied by North American Plastic bearing product number 22561 which has a lower brittle point than many other grades of PVC. Alternatively, for a plenum-rated cable, outer jacket 16 can be formed of a plenum grade PVC, such as Smokeguard 8512 PVC supplied by Alpha Gary. In the plenum rated embodiment, it is preferred to use a dry superabsorbent substance rather than a grease filling compound, and a flame retarded PE buffer tube, as will be further described below.

As depicted in FIG. 1, a number of cable components are typically disposed between outer jacket 16 and buffer tube 12. Notably, fiber optic cable 10 includes a composite tape 20 generally surrounding buffer tube 12 that provides both flame retardant and water blocking properties. As shown in more detail in FIG. 2, composite tape 20 includes a layer 22 formed of a preferably intrinsically flame retardant material that has first and second opposed surfaces. Composite tape 20 preferably includes a water swellable, i.e., water absorbent, substances or coatings 24,26 formed on respective sides of layer 22 (FIG. 2). For example, layer 22 can comprise an intrinsically flame retardant refractory material, e.g., a woven glass with a non-particulate absorbent substance coating, a synthetic mica and scrim having an absorbent substance coating, or a natural mica with scrim and a particulate swell powder in a non-woven substrate. As an alternative or in addition to refractory materials, the present invention can be practiced in the form of intrinsically flame retardant polymeric materials having an absorbent substance, for example, polyimide, polyetherimides, aramid based NOMEX available from E.I. Dupont & Company.

Generally, first and second coatings 24,26 are formed of a superabsorbent polymer, such as a partially cross-linked acrylate polymer. As a result of its integral construction, composite tape 20 having flame retardant layer 22 and at least one, but preferably two, water swellable coatings is preferably thinner than the cumulative thickness of conventional water swellable tapes and a flame retardant tape, thereby permitting the size of fiber optic cable 10 to be reduced. Moreover, the integral construction of composite tape 20 reduces the number of cable components, thereby somewhat simplifying the fabrication of fiber optic cable 10 and reducing manufacturing costs, and making fiber access/termination and cable preparation procedures less difficult.

Fiber optic cable 10 can also include one or more rovings 28 extending longitudinally along buffer tube 12 for increasing the tensile strength of fiber optic cable 10. In the illustrated embodiment, for example, fiber optic cable 10 includes a plurality of fiberglass strands, such as CR1700 strands supplied by Owens-Corning, that extend lengthwise along buffer tube 12. In addition, fiber optic cable 10 can include one or more preferably generally diametrically disposed ripcords 30 for facilitating the removal of outer jacket 16 from the cable core including buffer tube 12 and optical fibers 14. Although not depicted, fiber optic cable 10 can also include other conventional cable components, such as an armor layer between jacket 16 and tube 12, depending upon the requirements of the intended application.

Fiber optic cable 10 of the embodiment depicted in FIG. 1 can have different sizes depending upon the application in which fiber optic cable 10 is to be deployed. In one exemplary embodiment buffer tube 12 includes a stack of 10 to 18 optical fiber ribbons, each of which includes 24 optical fibers. In this embodiment, buffer tube 12 has an inner diameter of about 11.2 millimeters and an outer diameter of about 14.2 millimeters. Composite tape 20 that includes both a flame retardant layer 22 and first and second water swellable coatings 24, 26 tightly surrounds buffer tube 12 and has an outer diameter of about 14.6 millimeters. Outer jacket 16 can, in turn, surround composite tape 20 and has an inner diameter of about 16.0 millimeters and an outer diameter of about 20.0 millimeters.

Regardless of its size, fiber optic cable 10 has both flame retardant and water blocking properties and is therefore particularly well-suited for indoor/outdoor applications. In this regard, water blocking element 18 disposed within buffer tube 12, such as a filling compound or a water swellable tape, prevents water from migrating through buffer tube 12. In addition, the water swellable coating(s) 24, 26 of composite tape 20 that surrounds buffer tube 12 inhibits water migration along the length of fiber optic cable 10 in the space between outer jacket 16 and buffer tube 12. Moreover, flame retardant layer 22 of composite tape 20 provides the flame retardant properties for indoor or indoor/outdoor use of the cable.

While fiber optic cable 10 depicted in FIG. 1 is advantageous for providing for flame retardant and water blocking properties, fiber optic cable 10 can be embodied in different manners while still providing these same properties. As shown in FIG. 3, for example, fiber optic cable 10 of another advantageous embodiment of the present invention is depicted. As described in conjunction with the embodiments of FIG. 1, fiber optic cable 10 of FIG. 2 includes at least one and, more typically, a plurality of optical fibers 14 disposed within at least one buffer tube 12 which, in turn, is disposed within an outer jacket 16.

In order to provide flame retardance, buffer tube 12 of this embodiment is comprised of a flame retardant material. For example, buffer tube 12 can be formed of a flame retarded polyethylene or a flame retardant PVC. With respect to water blocking, fiber optic cable 10 generally includes at least one water swellable tape 40 disposed within buffer tube 12 and longitudinally wrapped about optical fibers 14. As described above, water swellable tape 40 typically includes a plurality of superabsorbent particles, typically formed of a partially cross-linked acrylate polymer, sandwiched between a pair of non-woven fabric layers, but can be formed in other fashions if so desired. By swelling upon exposure to water, water swellable tape 40 prevents water migration through buffer tube 12. Additionally, water migration between outer jacket 16 and buffer tube 12 is prevented since fiber optic cable 10 of this embodiment also includes at least one but preferably 2 layers of about 10 rovings 28 extending lengthwise along buffer tube 12 that has a coating 42 comprised of a water swellable material, as depicted in FIG. 4. The two layers of rovings 28 can be counter-helically stranded. In addition, layers of rovings 28 can be disposed on opposing sides of tape 20 with a preferably counter-helical stranding (FIG. 1A). While rovings 28 can be comprised of various materials, rovings 28 of one advantageous embodiment are formed of fiberglass strands. Each roving is also preferably coated and/or impregnated with a water swellable material, such as a superabsorbent polymer and, more particularly, a partially cross-linked acrylate polymer, such that, upon exposure to water, the water swellable coating of each roving will swell in order to prevent migration of water along the length of fiber optic cable 10 in the space between outer jacket 16 and buffer tube 12. Fiber optic cable 10 preferably includes a plurality of rovings disposed in at least one layer circumferentially about buffer tube 12. With respect to the embodiment depicted in FIG. 3, rovings 28 are depicted as somewhat irregularly shaped elements, each of which typically includes a plurality of coated fiberglass strands. As shown in FIG. 3, the fiber optic cable can also include other components disposed between buffer tube 12 and the outer jacket 16 including an armor layer (not shown) and one or more ripcords 30 for facilitating the removal of outer jacket Like the embodiment of fiber optic cable 10 depicted in FIG. 1, fiber optic cable 10 of FIG. 2 can have various sizes depending upon the intended application. In one embodiment, for example, buffer tube 12 has an inner diameter of about 11.2 millimeters and an outer diameter of about 14.2 millimeters, while outer jacket 16 has an inner diameter of about 16.0 millimeters and an outer diameter of about 19.5 millimeters. Regardless of the size, fiber optic cable 10 of the embodiment of FIG. 3 also provides both water blocking and flame retardant properties such that fiber optic cable 10 is particularly well suited for indoor or indoor/outdoor applications. By coating rovings 28 with a water swellable material and by including a buffer tube 12 formed of a flame retardant material, fiber optic cable 10 of the embodiment of FIG. 2 has a reduced number of cable components thereby facilitating the manufacture of fiber optic cable 10 and potentially permitting both the cost and the size of fiber optic cable 10 to be reduced relative to a conventional fiber optic cable.

Preferred indoor/outdoor applications for fiber optic cables made according to the present inventive concepts comprise riser/outdoor and plenum/Outdoor applications. The indoor/outdoor riser cable may have a grease filled tube, a swellable flame retardant tape and a flame retarded PVC jacket. The indoor/outdoor riser cable could also have a dry tube with a dry superabsorbent substance in tube 12 as a water blocking means, a tube 12 formed of a riser grade PVC or FRPE with no tape 20 or polyimide tape, and a flame retarded riser rated jacket. A plenum/outdoor cable could include a plenum grade PVC jacket material with an FRPE or plenum grade PVC buffer tube preferably without grease, a polyimide tape 20 or no tape at all could be used.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. The invention has been described with reference to monotube designs but the inventive concepts of the present invention are applicable to other cable types as well, for example, stranded tube designs and break out cables.

What is claimed is:

1. A fiber optic cable comprising:
   at least one buffer tube;
   at least one optical fiber disposed within said buffer tube;
   a composite tape surrounding said buffer tube, said composite tape comprising a layer formed of an inherently flame retardant material and having first and second opposed surfaces, said composite tape also comprising radially inner and outer layers of water swellable material disposed on said flame retardant layer; and
   a jacket surrounding said composite tape, wherein said water swellable coating of said composite tape inhibits water migration between said jacket and said buffer tube.

2. A fiber optic cable according to claim 1 wherein said water swellable material is a substance, coating, or particles attached to the flame retardant layer.

3. A fiber optic cable according to claim 1 wherein said flame retardant layer is comprised of an inherently flame retardant material selected from the group consisting of synthetic mica, natural mica, glass, polyimide, and aramid.

4. A fiber optic cable according to claim 1 further comprising a filling compound disposed within said buffer tube and surrounding said at least one optical fiber.

5. A fiber optic cable according to claim 1 further comprising a tape comprised of a water swellable material that at least partially surrounds said at least one optical fiber for inhibiting water migration through said buffer tube.

6. A fiber optic cable according to claim 1 further comprising at least one roving extending lengthwise along said buffer tube.

7. A fiber optic cable according to claim 6 wherein said at least one roving comprises a plurality of fiberglass strands.

8. A fiber optic cable comprising:
   at least one buffer tube;
   at least one optical fiber disposed within said buffer tube;
   a composite tape surrounding said buffer tube, said composite tape comprising a layer formed of an inherently flame retardant material and having first and second opposed surfaces comprising radially inner and outer layers of water swellable material disposed on said flame retardant layer; and
   a jacket surrounding said composite tape, a layer of rovings being disposed between said tube and said jacket.

9. A fiber optic cable according to claim 8 wherein said composite tape comprises a layer of refractory or polymeric material.

10. A fiber optic cable according to claim 8 wherein said flame retardant layer is comprised of an inherently flame retardant material selected from the group consisting of synthetic mica, natural mica, glass, polyimide and aramid.

11. A fiber optic cable according to claim 9 further comprising a second layer of rovings disposed between said jacket and said tube.

12. A fiber optic cable according to claim 11 wherein said at least one of said rovings comprises a plurality of fiberglass strands.

* * * * *